(12) United States Patent
Onaka et al.

(10) Patent No.: US 7,349,697 B2
(45) Date of Patent: Mar. 25, 2008

(54) MOBILE COMMUNICATION SYSTEM, MOBILE TERMINAL, SUBSCRIBER INFORMATION MANAGEMENT APPARATUS, MOBILE NETWORK SYSTEM, LOCATION AREA INFORMATION REGISTRATION METHOD AND CALL CONTROL METHOD

(75) Inventors: Hidetoshi Onaka, Kanagawa (JP); Shoichi Hirata, Tokyo (JP)

(73) Assignee: NTT DoCoMo, Inc., Chiyoda-ku, Tokyo (JP)

(*) Notice: Subject to any disclaimer, the term of this patent is extended or adjusted under 35 U.S.C. 154(b) by 909 days.

(21) Appl. No.: 09/903,958

(22) Filed: Jul. 12, 2001

(65) Prior Publication Data

US 2002/0006808 A1 Jan. 17, 2002

(30) Foreign Application Priority Data

Jul. 14, 2000 (JP) ............................. 2000-215097

(51) Int. Cl.
*H04Q 7/20* (2006.01)
*H04M 1/00* (2006.01)

(52) U.S. Cl. ............................. 455/435.1; 455/432.1; 455/433; 455/435.2; 455/556.1

(58) Field of Classification Search ................ 455/550, 455/456.1, 456.6, 445, 455, 433, 410, 558, 455/432.1, 435.1, 552.1, 556.1, 435.2; 379/88.01; 439/500
See application file for complete search history.

(56) References Cited

U.S. PATENT DOCUMENTS 5,511,111 A * 4/1996 Serbetcioglu et al. .... 379/88.01
5,764,730 A   6/1998 Rabe et al.
5,765,105 A * 6/1998 Kuriki ......................... 455/410
5,875,404 A * 2/1999 Messiet ....................... 455/558
6,185,436 B1 * 2/2001 Vu .............................. 455/558
6,223,042 B1 * 4/2001 Raffel ......................... 455/455
6,230,017 B1 * 5/2001 Andersson et al. ...... 455/456.6
6,244,894 B1 * 6/2001 Miyashita ................... 439/500

(Continued)

FOREIGN PATENT DOCUMENTS

EP       0 926 612      6/1999

(Continued)

OTHER PUBLICATIONS

Search Report for application No. EP 01 30 5995, May 29, 2002.

(Continued)

*Primary Examiner*—Thjuan K. Addy
(74) *Attorney, Agent, or Firm*—Workman Nydegger

(57) ABSTRACT

A mobile terminal can be loaded with a plurality of subscriber identity module cards at the same time, and register the condition to a mobile communication network. The mobile terminal comprises detects a loading of a recording medium (such as an IC card like the SIM card), and transmits, when the detecting means detects at least two recording media, first subscriber identity information (e.g. IMSI, TMSI, etc.) corresponding to a first recording medium and second subscriber identity information corresponding to a newly detected recording medium, to the subscriber information management apparatus such as a visitor location register (VLR). The subscriber information management apparatus registers location area information of the first subscriber identity information as location area information associated with the second subscriber identity information.

8 Claims, 10 Drawing Sheets

U.S. PATENT DOCUMENTS 6,324,402 B1 * 11/2001 Waugh et al. ............... 455/445
6,324,405 B1 * 11/2001 Young et al. ............ 455/456.1
6,366,777 B1 * 4/2002 Uusitalo ...................... 455/433
6,799,057 B1 * 9/2004 Liverotti ..................... 455/558

FOREIGN PATENT DOCUMENTS

| JP | 6-506575 | 7/1994 |
|---|---|---|
| JP | 8-511144 | 11/1996 |
| JP | 08-321802 | 12/1996 |
| WO | WO92/19078 | 10/1992 |
| WO | WO 99/62282 | 12/1999 |
| WO | WO 00/36869 | 6/2000 |

OTHER PUBLICATIONS

Official Notice of Rejection Japan Patent Application No. 2001-213914 Case No. DCMH130190.

* cited by examiner

HLR

| TELEPHONE NUMBER | SUBSCRIBER IDENTITY IMFORMATION | VLR OF VISITED AREA |
|---|---|---|
| 0A0-C1D1E1-F1G1H1I1 | IMSI1 | VLR1 |
| 0A0-C2D2E2-F2G2H2I2 | IMSI2 | VLR1 |

VLR1

| TELEPHONE NUMBER | SUBSCRIBER IDENTITY IMFORMATION | TEMPORARY SUBSCRIBER IDENTITY INFORMATION | LOCATION AREA ID | COMMUNICATION STATE |
|---|---|---|---|---|
| 0A0-C1D1E1-F1G1H1I1 | IMSI1 | TMSI1 | LAI1 | IN COMMUNICATION |
| 0A0-C2D2E2-F2G2H2I2 | IMSI2 | TMSI2 | LAI2 | VACANT |

MOBILE COMMUNICATION SYSTEM, MOBILE TERMINAL, SUBSCRIBER INFORMATION MANAGEMENT APPARATUS, MOBILE NETWORK SYSTEM, LOCATION AREA INFORMATION REGISTRATION METHOD AND CALL CONTROL METHOD

This application claims priority under 35 U.S.C. 119 to Patent Application No. 2000-215097 filed Jul. 14, 2000 in Japan, the content of which is incorporated hereinto by reference.

BACKGROUND OF THE INVENTION

1. Field of the Invention

The present invention relates to a mobile communication system, a mobile terminal, a subscriber information management apparatus, a mobile network system, a location area information registration method and a call control method, and more particularly to a mobile communication system, a mobile terminal, a subscriber information management apparatus and a location area information registration method in which outgoing calls and incoming calls using a plurality of telephone numbers, mail addresses, etc. can be performed by loading a mobile terminal with a plurality of recording media (e.g. SIM cards), and a mobile network system and a call control method performing call control related to such mobile terminal.

2. Description of the Related Art

A system that separately includes a mobile terminal and an IC card that serves as a recording medium such as an SIM (Subscriber Identity Module) card for storing subscriber information, is implemented in the GSM (Global System for Mobile Communication). Currently, the GSM offers card type and plug-in type SIM cards.

FIG. 1 is a schematic diagram showing a conventional mobile communication system employing mobile terminals using SIM cards.

The mobile communication system comprises at least a mobile terminal 10, a base station (BSS) 20 and a mobile network (system) 30. The mobile terminal 10, which carries out radio communication with the base station 20, has a detachable SIM card 12 storing its own IMSI (International Mobile Subscriber Identity). The base station 20, which is connected to the mobile network 30, carries out radio communication with the visiting mobile terminal 10. The mobile network 30, which comprises at least a mobile switching center (MSC) 40, a visitor location register (VLR) 50 and a home location register (HLR) 60, carries out line switching or packet switching of the mobile communication. The mobile network 30 can utilize an existing PDC (Personal Digital Cellular) mobile line switching network or PDC-P (Personal Digital Cellular-Packet) mobile packet switching network. As for the PDC and PDC-P, however, the home location register achieves the function of the visitor location register. The mobile switching center 40 is a switching center in the mobile communication network. The visitor location register 50 is a database of the subscriber information needed for controlling the mobile terminal 10 in the visited area controllable by one or more mobile switching offices. The home location register 60 is a database storing the original subscriber information on the service contract of each mobile terminal 10.

Here, assume that a person B has two SIM cards 12, an SIM card 12-1 of A corporate contract and an SIM card 12-2 of B personal contract, and uses the mobile terminal 10-1 mounted with the SIM card 12-1, and the mobile terminal 10-2 with the SIM card 12-2, and that the mobile terminal 10-1 is in an area with a location area ID1 (LAIL: Location Area Identification 1) that is set by the mobile network in the A corporation, and the mobile terminal 10-2 is in another area with a location area ID2 that is set by the mobile network.

FIG. 2 is a diagram showing information stored in the databases of the conventional HLR and VLR. The HLR database stores at least telephone numbers, subscriber identity information (IMSIs: International Mobile Subscriber Identities) and VLRs of the visited areas by the mobile terminals. On the other hand, the VLR database stores at least telephone numbers, subscriber identity information (IMSIs) in the visited area managed by the VLR, temporary subscriber identity information (TMSIs: Temporary Mobile Subscriber Identities), location area IDs (LAIs) and communication state.

For example, the example shown in FIG. 1 has the databases storing the information as shown in FIG. 2.

Then, the mobile network 30 temporarily stores call records (start time and end time of the calls) of individual telephone numbers, so that the mobile network 30 transmits the telephone numbers and call records to a charge system that computes charges of the individual telephone numbers.

However, the conventional mobile terminal 10 cannot mount a plurality of SIM cards 12 thereon. Thus, to use the corporate contract SIM card 12-1 and the personal contract SIM card 12-2, it has a problem of making it necessary to replace the SIM cards 12, or to use a plurality of mobile terminals 10 such as the corporation mobile terminal 10-1 and the personal mobile terminal 10-2.

In addition, there is another problem involved in separately billing the users sharing a single telephone number. Although the PDC system enables individual users sharing its single telephone number to receive their own bills by adding, when making a call, a predetermined number assigned to each user for separate billing before the called number, it presents the following problems. First, it is necessary for the users to add the special numbers every time they make a call. Second, this service does not send the bills to the respective users of the telephone contracted. As a result, there is another problem in that it is necessary for the contractor to adjust the charges of the individual users.

SUMMARY OF THE INVENTION

In view of the foregoing problems, an object of the present invention is to provide a mobile communication system, a mobile terminal, a subscriber information management apparatus and a location area information registration method in which outgoing calls and incoming calls using a plurality of telephone numbers, mail addresses, etc. can be performed by loading a mobile terminal with a plurality of recording media, and a mobile network system and a call control method performing call control related to such mobile terminal.

In the first aspect of the present invention, there is provided a mobile communication system comprising a mobile terminal and a subscriber information management apparatus that manages subscriber information, wherein the mobile terminal comprises: detecting means for detecting a loading of a recording medium; and transmitting means for transmitting, when the detecting means detects at least two recording media, first subscriber identity information corresponding to a first recording medium and second subscriber identity information corresponding to a newly detected recording medium, to the subscriber information management apparatus, and wherein the subscriber information management apparatus comprises: receiving means for receiving the first subscriber identity information and the second subscriber identity information from the mobile terminal; and registering means for registering location area information of the first subscriber identity information as location area information associated with the second subscriber identity information.

Here, the recording media may be a subscriber identity module card.

Here, the first subscriber identity information may be subscriber identity information stored in the first recording medium or temporary subscriber identity information corresponding to the subscriber identity information stored in the first recording medium, and the second subscriber identity information may be subscriber identity information stored in the newly detected recording medium.

Here, the first subscriber identity information and the second subscriber identity information may be associated with respective telephone numbers.

Here, the first subscriber identity information and the second subscriber identity information may be associated with respective mail addresses.

In the second aspect of the present invention, there is provided a mobile terminal comprising: detecting means for detecting a loading of a recording medium; and transmitting means for transmitting, when the detecting means detects at least two recording media, first subscriber identity information corresponding to a first recording medium and second subscriber identity information corresponding to a newly detected recording medium, to a subscriber information management apparatus that manages subscriber information.

In the third aspect of the present invention, there is provided a subscriber information management apparatus for managing subscriber information, comprising: receiving means for receiving first subscriber identity information and second subscriber identity information from a mobile terminal; and registering means for registering location area information of the first subscriber identity information as location area information associated with the second subscriber identity information.

In the fourth aspect of the present invention, there is provided a mobile network system comprising: managing means for managing communication state of a mobile terminal having at least two telephone numbers; judging means for judging, when an incoming call to the mobile terminal occurs, whether the mobile terminal is in communication by using any one of the telephone numbers, based on the communication state; and processing means for performing a process for the incoming call in accordance with the judgment.

In the fifth aspect of the present invention, there is provided a location area information registration method for a mobile communication system comprising a mobile terminal and a subscriber information management apparatus that manages subscriber information, the method comprising: a detecting step of detecting a loading of a recording medium at the mobile terminal; a transmitting step of transmitting, when the detecting step detects at least two recording media, first subscriber identity information corresponding to a first recording medium and second subscriber identity information corresponding to a newly detected recording medium, from the mobile terminal to the subscriber information management apparatus; and a registering step of registering location area information of the first subscriber identity information as location area information associated with the second subscriber identity information at the subscriber information management apparatus.

In the sixth aspect of the present invention, there is provided a call control method in a mobile network system comprising managing means for managing communication state of a mobile terminal having at least two telephone numbers, the method comprising: a judging step of judging, when an incoming call to the mobile terminal occurs, whether the mobile terminal is in communication by using any one of the telephone numbers, based on the communication state; and a processing step of performing a process for the incoming call in accordance with the judgment.

Thus, the mobile terminal comprises detecting means (corresponding to an SIM card & key interface (I/F), a CPU, etc.) for detecting a loading of a recording medium (such as an IC card like the SIM card), and transmitting means for transmitting, when the detecting means detects at least two recording media, first subscriber identity information (e.g. IMSI, TMSI, etc.) corresponding to a first recording medium and second subscriber identity information corresponding to a newly detected recording medium, to the subscriber information management apparatus such as a visitor location register (VLR), and the subscriber information management apparatus comprises receiving means for receiving the first subscriber identity information and the second subscriber identity information from the mobile terminal, and registering means for registering location area information of the first subscriber identity information as location area information associated with the second subscriber identity information. In this way, the mobile terminal can be loaded with the plurality of SIM cards, and register the state to the mobile communication network, thereby enabling an outgoing or incoming call with the telephone numbers corresponding to the respective SIM cards. In addition, a user of the mobile terminal can select either the SIM card or the telephone number associated with the SIM card to be used for making an outgoing call by a key operation on an operation block.

Also, the mobile network system comprises managing means for managing communication state of a mobile terminal having at least two telephone numbers, judging means for judging, when an incoming call to the mobile terminal occurs, whether the mobile terminal is in communication by using any one of the telephone numbers, based on the communication state, and processing means for performing a process for the incoming call in accordance with the judgment. In this way, the mobile network system performs call control related to such mobile terminal.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a table showing information stored in the database of a conventional HLR and the database of a conventional VLR;

DETAILED DESCRIPTION OF PREFERRED EMBODIMENTS

Embodiments in accordance with the present invention will now be described with reference to the accompanying drawings.

Figure 1:
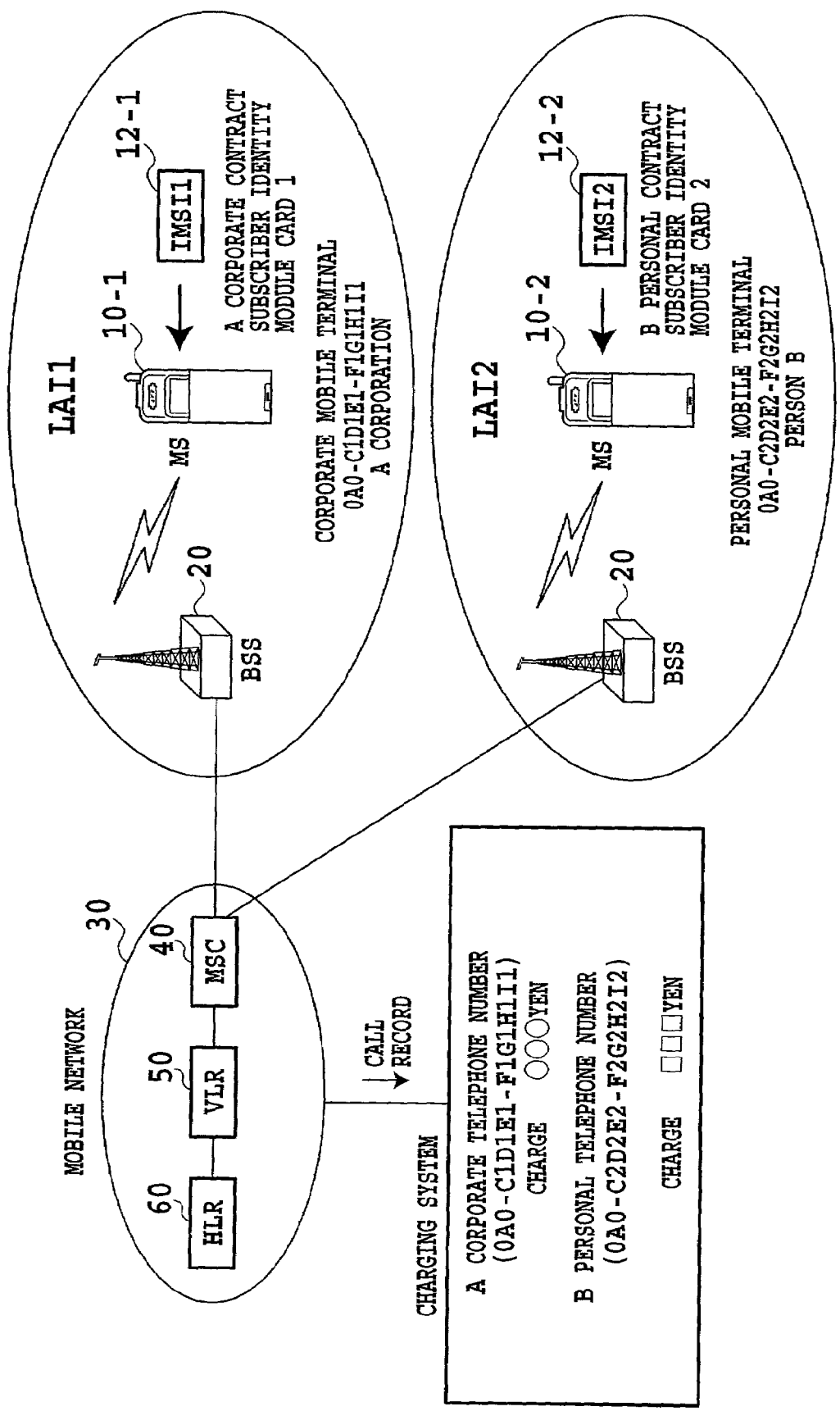
FIG. 1 is a schematic diagram showing a mobile communication system employing a conventional mobile terminal using an SIM card.
Figure 3:
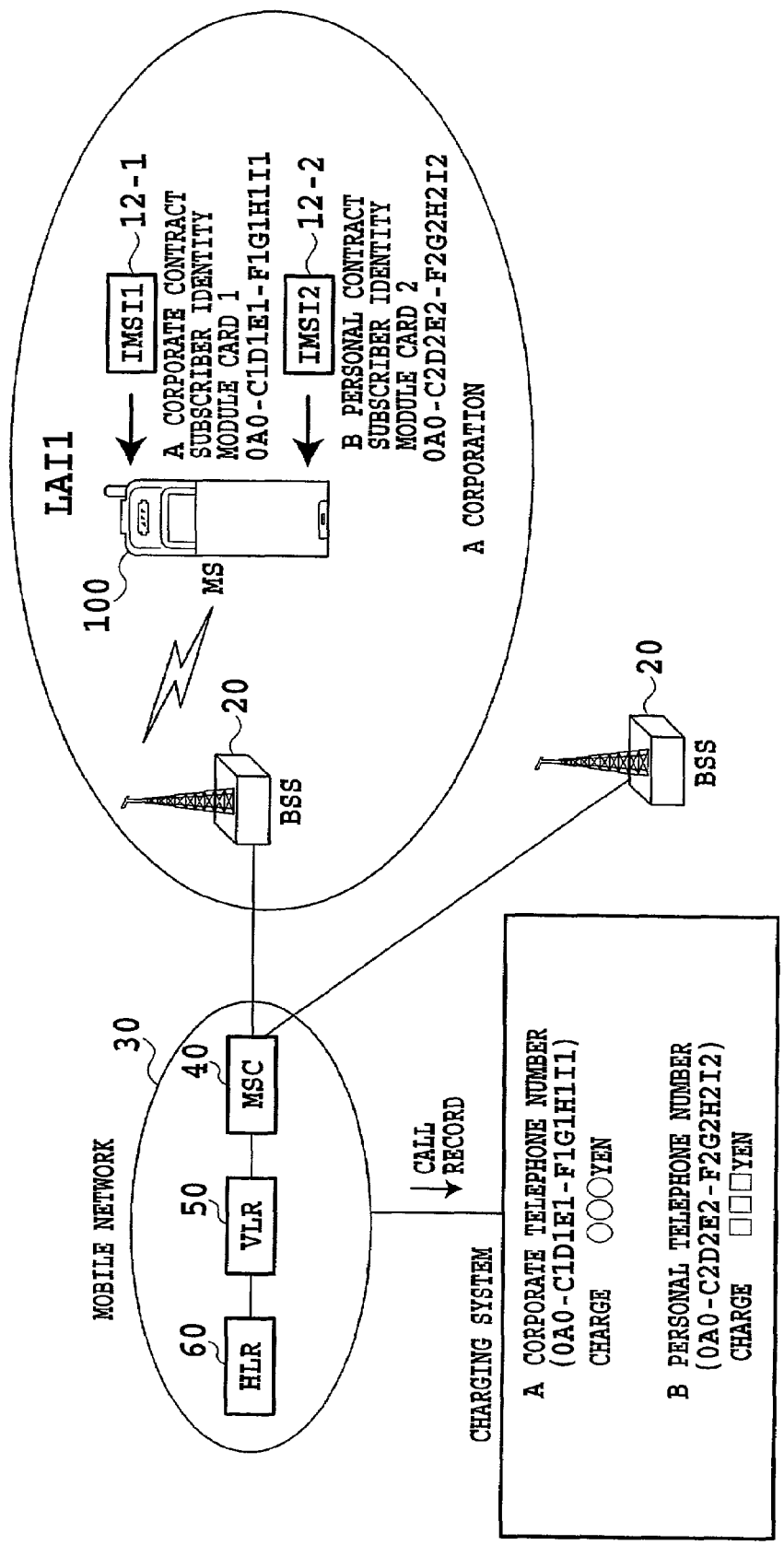
FIG. 3 is a block diagram showing a configuration of a mobile communication system to which the present invention is applied.

FIG. 3 is a block diagram showing a configuration of a mobile communication system to which the present invention is applied, which schematically shows only portions of the mobile communication system relevant to the present invention. In FIG. 3, the same reference numerals designate the blocks with the same functions as those of FIG. 1, and the description thereof is omitted here.

The mobile communication system comprises at least a mobile terminal 100, a base station (BSS) 20 and a mobile network 30. The mobile terminal 100 carries out radio communication with the base station 20, and is configured such that a plurality of SIM cards 12 that store their own IMSI (International Mobile Subscriber Identity) are detachably loaded on it.

In FIG. 3, a person B has two SIM cards 12, an SIM card 12-1 of A corporate contract and an SIM card 12-2 of B personal contract, and uses the mobile terminal 10-1 loaded with the SIM cards 12-1 and 12-2 in an A corporation. Here, the A corporation exists in an area with a location area ID (LAI: Location Area Identification) 1 established in the mobile network.

Figure 4:
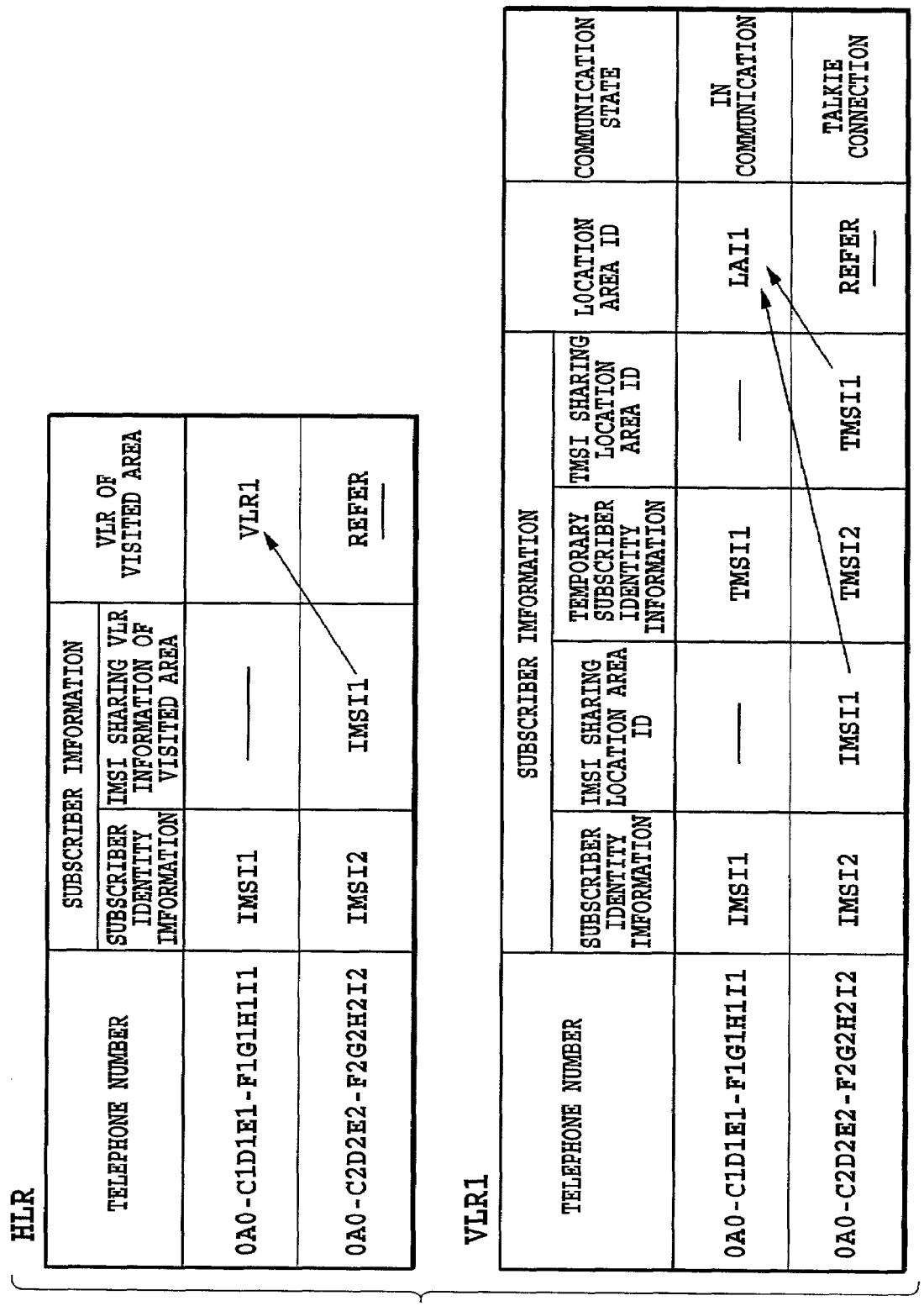
FIG. 4 is a table showing information stored in the database of an HLR and the database of a VLR in accordance with the present invention.

FIG. 4 is a table showing information stored in the databases of an HLR and a VLR in accordance with the present invention.

The HLR database stores at least telephone numbers, subscriber information and VLRs of the visited area of the mobile terminal. On the other hand, the VLR database stores at least telephone numbers, subscriber information, location area IDs (LAIs) and communication state. Here, the subscriber information stored in the HLR database includes subscriber identity information (IMSIs: International Mobile Subscriber Identities), and IMSIs sharing VLR information of visited area. When the plurality of SIM cards 12 are loaded on the single mobile terminal 100, the first IMSI1 is registered as the IMSI with which the second and the following SIM cards 12 share VLR information of visited area, so that they refer to the VLR information of the visited area of the first IMSI to obtain their VLRs of the visited areas of the IMSIs assigned to them. On the other hand, the subscriber information stored in the VLR database includes subscriber identity information (IMSIs), IMSIs sharing VLR information of visited area, temporary subscriber identity information (TMSIs: Temporary Mobile Subscriber Identities) of visited areas managed by VLRs, and TMSIs sharing VLR information of visited area. When the plurality of SIM cards 12 are loaded on the single mobile terminal 100, the first IMSI1 is registered as the IMSI with which the second and the following SIM cards 12 share the location area ID, and the first TMSI1 is registered as the TMSI with which the second and the following SIM cards 12 share the location area ID, so that they refer to the location area ID of the first IMSI and TMSI to obtain their location area IDs of the IMSIs and TMSIs assigned to them.

In this way, the locations of the second and the following SIM cards always become the same as the location of the first SIM card. Further, when the location of the mobile terminal 100 on which the plurality of SIM cards are loaded changes, only one communication sequence of location registration between the mobile terminal 100 and the mobile network 30 is needed, and communication sequences of the second and the following SIM cards are not necessary. Therefore, wasteful use of wire links of the mobile network 30 and air between the mobile network 30 and the mobile terminal 100 can be reduced.

In addition, in the database of the VLR, when the communication state of any one of the telephone numbers is in communication, the communication state of the remaining telephone numbers becomes talkie connection.

In the example of FIG. 3, the information is stored into the databases as shown in FIG. 4, for example.

The mobile network 30 temporarily stores call records (call start and end time) for individual telephone numbers, and transmits the telephone numbers and call records to a charge system that computes the charges for the respective telephone numbers.

When an incoming call to the mobile terminal 100 occurs, the MSC 40 of the mobile network 30 judges whether the mobile terminal 100 is in communication by using any one of the telephone numbers by communicating with the VLR 50 (it is possible to make the VLR 50 be a part of the MSC 40), and performs a process for the incoming call in accordance with the judgment.

In the present embodiment, the communication state of each telephone number of the mobile terminal 100 is managed in the database of the VLR 50. When an incoming call to the mobile terminal 100 occurs, and if the communication state of any one of the telephone numbers is in communication, the MSC 40 does not perform a call connection process and performs a talkie connection process to inform the terminal which issued the incoming call that connection cannot be made. In the present embodiment, the talkie connection process is performed. However it is possible to perform another process. On the other hand, if the communication state of all the telephone numbers is not in communication, the MSC 40 performs the call connection process.

Figure 5:
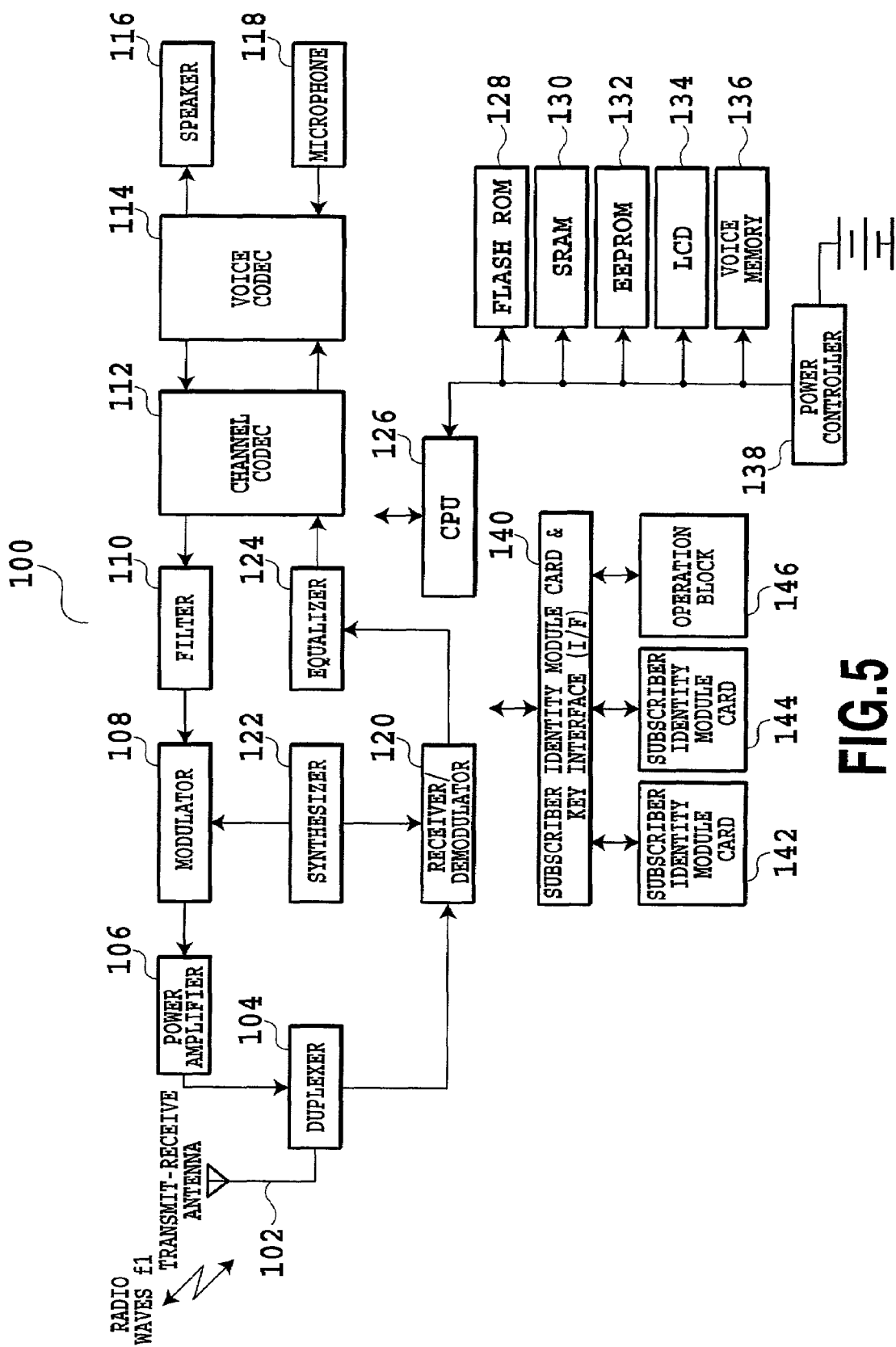
FIG. 5 is a block diagram showing a configuration of a mobile terminal to which the present invention is applied.

FIG. 5 is a block diagram showing a configuration of the mobile terminal 100 to which the present invention is applied, which schematically shows only portions of the mobile terminal 100 relevant to the present invention.

The mobile terminal 100 comprises at least a transmit-receive antenna 102, a duplexer 104, a power amplifier 106, a modulator 108, a filter 110, a channel codec 112, a voice codec 114, a speaker 116, a microphone 118, a receiver/demodulator 120, a synthesizer 122, an equalizer 124, a CPU 126, a flash ROM 128, an SRAM 130, an EEPROM 132, an LCD 134, a voice memory 136, a power controller 138, an SIM card & key interface (I/F) 140, SIM cards 142 and 144 and an operation block 146. The transmit-receive antenna 102 connected to the duplexer 104 operates as a transmit-receive antenna with high radiation efficiency in a frequency range used by the mobile communication system. The duplexer 104 is connected to both the power amplifier 106 and receiver/demodulator 120, and operates as a switch for enabling the antenna to be used for transmission and reception. The power amplifier 106 is connected between the duplexer 104 and the modulator 108 to amplify transmit waves. The modulator 108 is connected between the power amplifier 106 and the filter 110 to modulate its signal. The filter 110 is connected between the modulator 108 and the channel codec 112 to filter the signal corresponding to the mobile communication scheme used. The channel codec 112 is connected between the filter 110 and the voice codec 114 to carry out the channel codec. The voice codec 114 is connected with the speaker 116, the microphone 118 and the channel codec 112, and operates as a speech encoding codec corresponding to the mobile communication network. The speaker 116 is connected to the voice codec 114 to output voice information. The microphone 118 is connected to the voice codec 114 to input voice information. The receiver/demodulator 120 is connected with the duplexer 104, the synthesizer 122 and the equalizer 124 to receive and demodulate a signal. The synthesizer 122 is connected between the receiver/demodulator 120 and the modulator 108, and operates as a synthesizer of signals. The equalizer 124 is connected between the receiver/demodulator 120 and the channel codec 112, and can emphasize voice components of specified bands of the voice information to enhance high or low components in response to the voice of a party, thereby controlling the voice to improve intelligibility. The CPU 126 generally controls the individual blocks of the mobile terminal 100. The flash ROM 128 stores programs and instructions. The SRAM 130 is used as a working area of the programs. The EEPROM 132 stores electronic volume information and the like. The LCD 134 has a liquid crystal display function. The voice memory 136 stores voice data. The power controller 138 supplies power to the individual blocks and controls charging of the battery. The SIM card & key interface (I/F) 140 is connected to the SIM cards 142 and 144 and the operation block 146, and functions as the interface of the plurality of SIM cards and the key operation block. The SIM cards 142 and 144 are a subscriber identity module card that stores information like IMSIs for identifying the subscriber. The operation block 146 allows a user to control the power key, dial keys, functional keys, scroll keys and the like.

In the present embodiment with the foregoing configuration, the mobile terminal 100 comprises a detecting means and a transmitting means. The detecting means, which corresponds to the SIM card & key interface (I/F) 140 and the CPU 126, detects whether the recording medium (such as an IC card like the SIM card) storing the subscriber identity information like the IMSI is loaded or not. When the detecting means detects two or more recording media, the transmitting means transmits the first subscriber identity information stored in the first recording medium and the second subscriber identity information stored in the newly detected recording medium to the database of the visitor location register 50 and the like via the base station 20 and mobile switching center 40. The database comprises a registering means for registering the location area information of the first subscriber identity information as the location area information associated with the second subscriber identity information. In this way, the mobile terminal 100 can be loaded with the plurality of SIM cards, and register the state to the mobile communication network, thereby enabling an outgoing or incoming call using one of the telephone numbers assigned to the SIM cards. The user of the mobile terminal 100 can make a call by select either the SIM card or the telephone number associated with the SIM card using the operation block 146.

Figure 8:
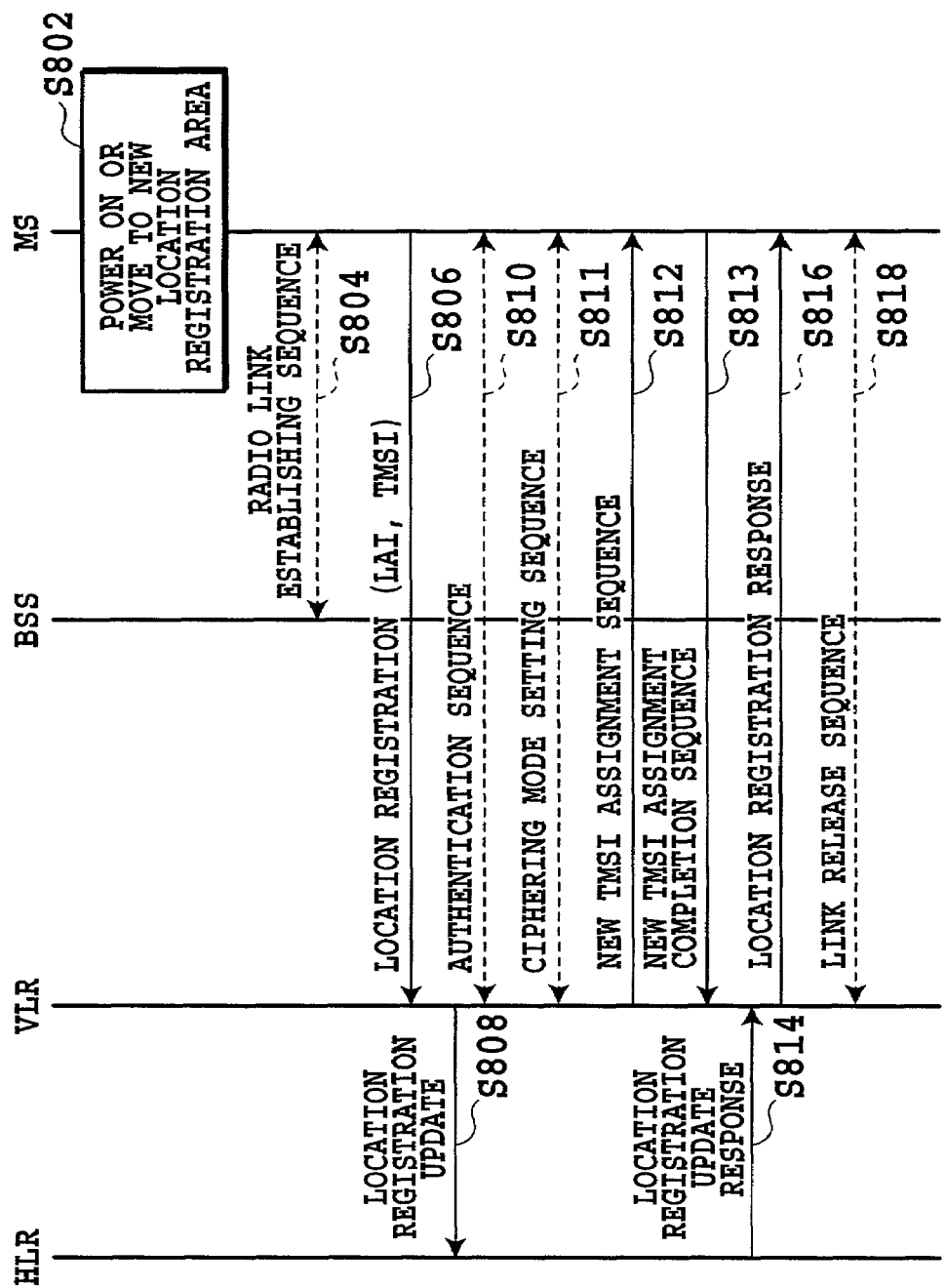
FIG. 8 is a diagram showing a communication sequence at the time when the mobile terminal is turned on or when it moves to another location registration area in the mobile communication system to which the embodiment in accordance with the present invention is applied.

FIG. 8 is a diagram showing a communication sequence at the time when the mobile terminal 100 is turned on, or moves to another location registration area in the mobile communication system to which the present embodiment in accordance with the invention is applied, in which only portions of the communication sequence relevant to the present invention is schematically shown.

First, the user turns on the mobile terminal 100, or moves to a new location registration area (step S802).

Subsequently, a radio link establishing sequence that is defined in the mobile network is carried out between the mobile terminal 100 and the base station 20 (step S804).

Subsequently, the mobile terminal 100 notifies the visitor location register 50 of the location registration of the LAI of the visited base station 20 using the TMSI (step S806). In this case, if the TMSI is not yet assigned to the mobile terminal 100 as when the SIM card is being put into the mobile terminal 100, the mobile station uses the IMSI.

Subsequently, when the mobile station enters a new VLR area in the mobile network 30, the new VLR is sent to the home location register 60 to update the location registration (step S808).

Subsequently, an authentication sequence and ciphering mode setting sequence are carried out between the mobile terminal 100 and the visitor location register 50 (steps S810 and S811). To ensure the security of the mobile communication, the authentication is required to prevent fraud of the mobile station, and the ciphering is necessary to prevent communication information leakage in the radio section. As for the authentication, it is carried out as follows: An encryption algorithm is carried out using an authentication key and a random number in the mobile communication network, and the random number is transmitted to the mobile station. The mobile station carries out the encryption algorithm using the authentication key registered in the mobile station and the random number transmitted from the mobile communication network, and sends its result back to the mobile communication network, which completes the authentication by comparing their results. As for the ciphering mode setting, it is achieved by scrambling the bit stream of the communication information and by transmitting it to the radio section. Thus, it becomes substantially impossible for a third party who does not know the authentication key to decipher the communication content even if the third party receives it.

After completing the ciphering mode setting sequence, the mobile terminal 100 stores a new TMSI the VLR assigns to it (step S812). Then, the mobile terminal 100 notifies the VLR that it has completed storing the new TMSI (step S813).

After registering the new VLR into its database, the home location register 60 sends a location registration update response back to the visitor location register 50 (step S814).

Thus, the visitor location register 50 sends a location registration response back to the mobile terminal 100 (step S816).

Subsequently, a link release sequence is carried out between the mobile terminal 100 and the visitor location register 50 (step S818).

Thus, the mobile network 30 can recognize that the mobile terminal 100 is turned on, or that it moves to another location registration area.

Figure 6:
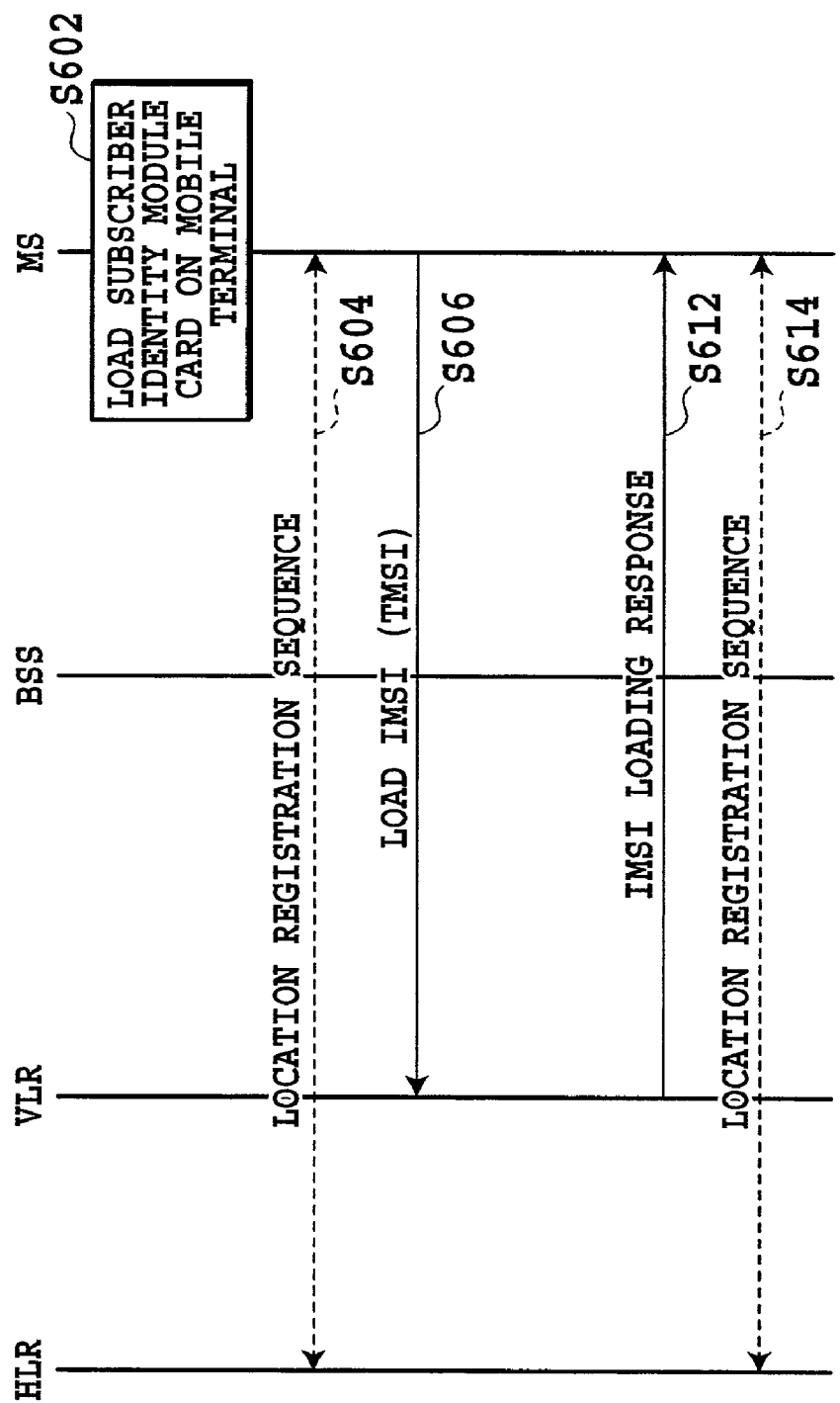
FIG. 6 is a diagram showing a communication sequence at the time when an SIM card is loaded on the mobile terminal in a mobile communication system to which an embodiment in accordance with the present invention is applied.

FIG. 6 is a diagram showing a communication sequence at the time when the SIM card is being mounted on the mobile terminal 100 in the mobile communication system to which the embodiment in accordance with the present invention is applied, in which only portions of the communication sequence relevant to the present invention are schematically shown.

First, the user places the SIM card 12 into the mobile terminal 100 (step S602).

Subsequently, the location registration to the mobile network is carried out through the communication sequence described in connection with FIG. 8 when the mobile station 100 is turned on or moves to another location registration area. In the course of the present sequence from step S604 to step S614, a communication sequence which will be described later has the mobile network 30 recognize that the mobile terminal 100 is loaded with a new SIM card 1.

Subsequently, the mobile terminal 100 notifies the visitor location register 50 of the loading of the IMSI using the TMSI (Temporary Mobile Subscriber Identity) that is used only temporarily (step S606). Here, although the subscriber identity information is uniquely assigned as the IMSI (International Mobile Subscriber Identity) in the mobile network, the TMSI is uniquely assigned only within a single location information area to be temporarily used in place of the IMSI as the subscriber identity information of the mobile station visiting the area of the location information. Since the TMSI has a bit length shorter than the IMSI, it can be more efficiently utilized in the air, and it can ensure its security because it is used instead of the IMSI.

Subsequently, the visitor location register 50 sends an IMSI loading response back to the mobile terminal 100 (step S612).

Thus, the mobile network 30 can recognize that the new SIM card 12 is loaded on the mobile terminal 100.

Figure 7:
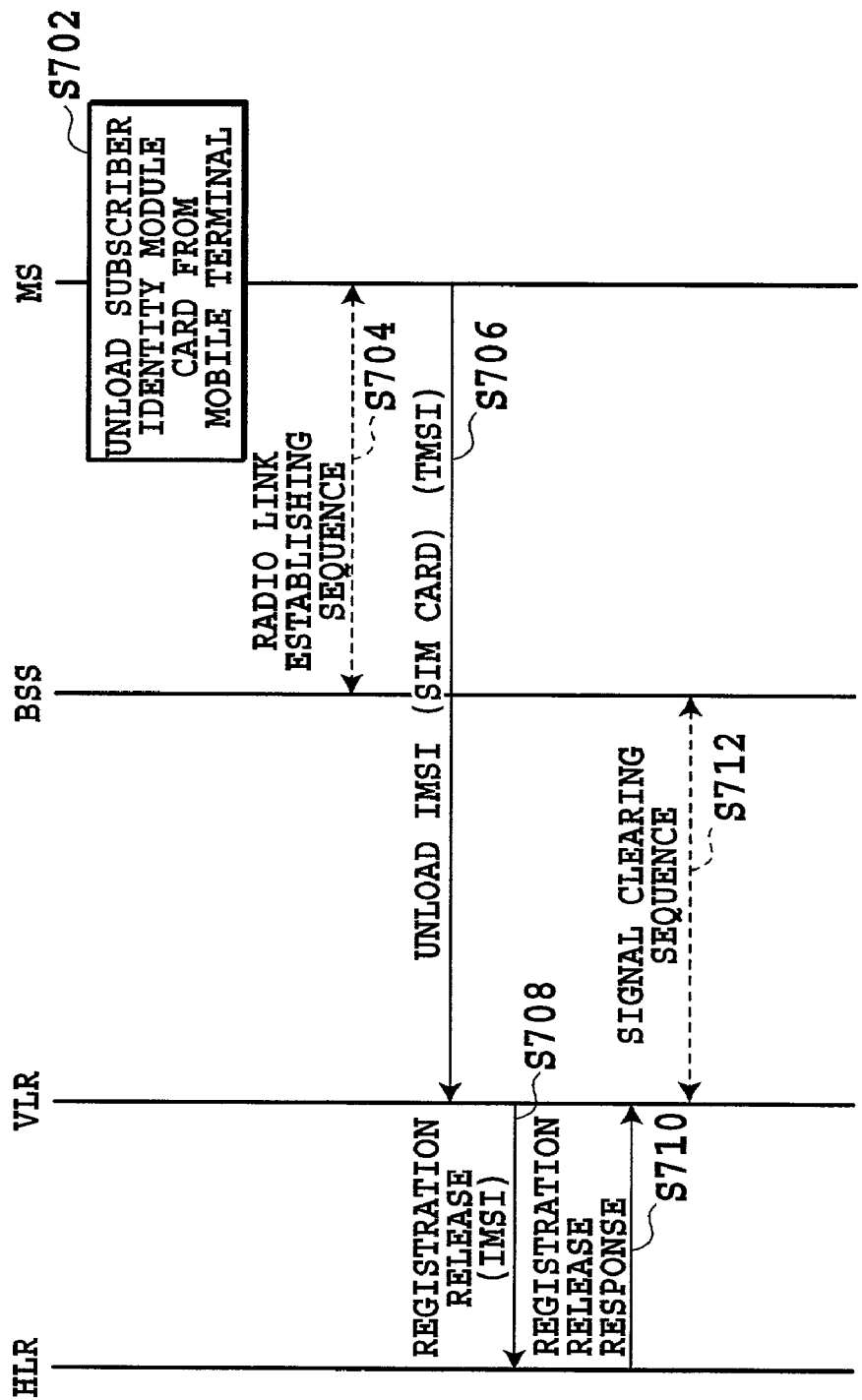
FIG. 7 is a diagram showing a communication sequence at the time when an SIM card is unloaded from the mobile terminal in the mobile communication system to which the embodiment in accordance with the present invention is applied.

FIG. 7 is a diagram showing a communication sequence at the time when the SIM card is unloaded from the mobile terminal 100 in the mobile communication system to which the embodiment in accordance with the present invention is applied, in which only portions of the communication sequence relevant to the present invention are schematically shown.

First, the user removes the SIM card 12 from the mobile terminal 100 (step S702).

Subsequently, the radio link establishing sequence that is defined in the mobile network is carried out between the mobile terminal 100 and the base station 20 (step S704).

Subsequently, the mobile terminal 100 notifies the visitor location register 50 of the removal of the IMSI using the TMSI (step S706).

In the mobile network 30, the visitor location register 50 converts the TMSI to the IMSI, and sends an IMSI registration release request to the home location register 60 (step S708).

Thus, the home location register 60 updates the content of the database, and sends an IMSI registration release response back to the visitor location register 50 (step S710).

Subsequently, a signal clearing sequence is carried out between the visitor location register 50 and the base station 20 (step S712).

Thus, the mobile network 30 can recognize that the SIM card 12 is removed from the mobile terminal 100.

Figure 9:
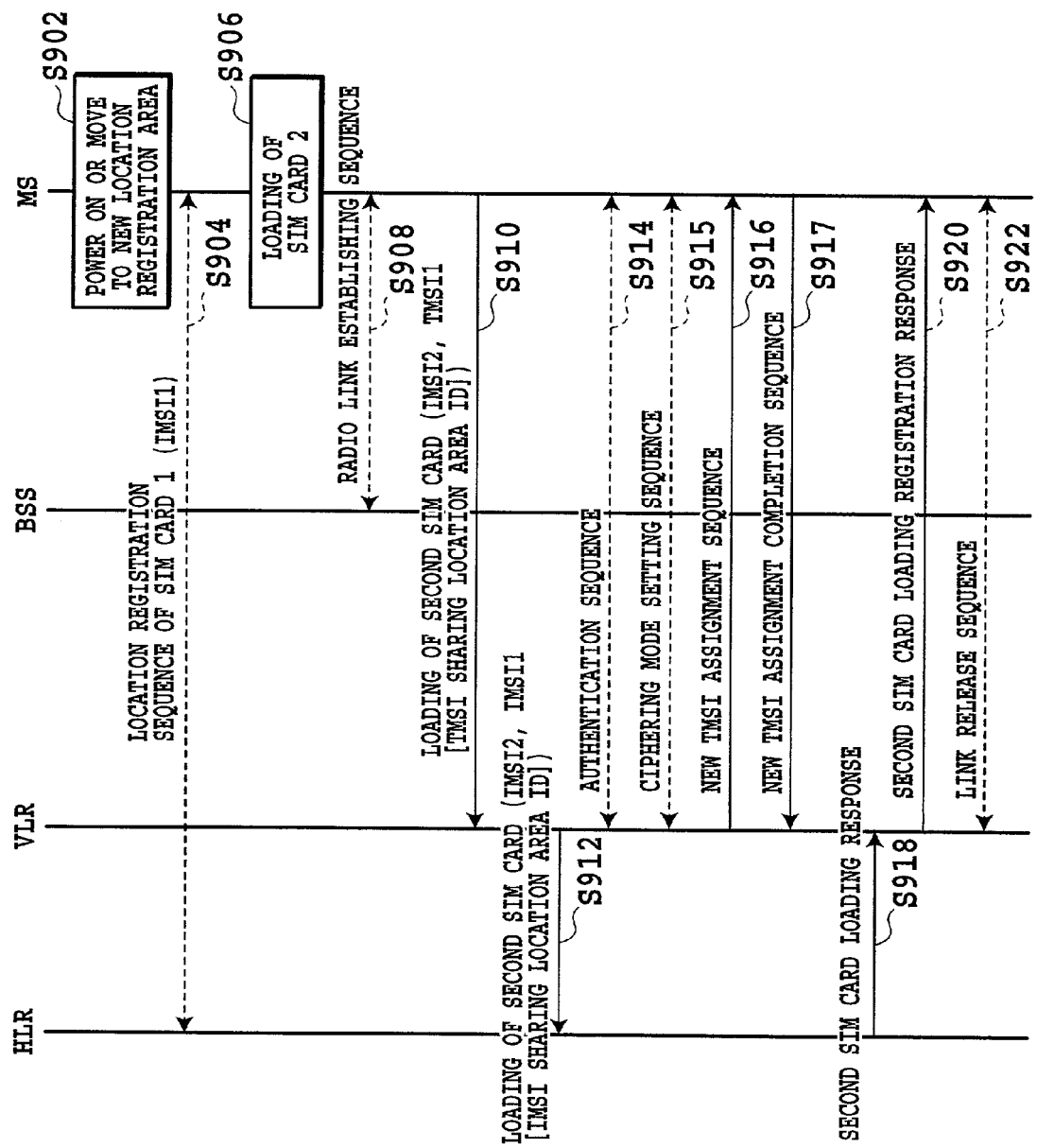
FIG. 9 is a diagram showing a communication sequence at the time when a second SIM card is loaded on the mobile terminal in the mobile communication system to which the embodiment in accordance with the present invention is applied.

FIG. 9 is a diagram showing a communication sequence at the time when the second SIM card is loaded on the mobile terminal 100 in the mobile communication system to which the present embodiment in accordance with the invention is applied, in which only portions of the communication sequence relevant to the present invention are schematically shown.

First, the user turns on the mobile terminal 100, or moves to a new location registration area (step S902).

Subsequently, the location registration update of the first SIM card, which has already been loaded through the procedure as shown in FIG. 8, is carried out (step S904).

Subsequently, the second SIM card is mounted on the mobile terminal 100 (step S906).

Then, the radio link establishing sequence defined in the mobile network is carried out between the mobile terminal 100 and the base station 20 (step S908).

Subsequently, the mobile terminal 100 notifies the visitor location register 50 of the loading of the second SIM card using the IMSI along with the common location area ID-assigned TMSI (first TMSI) (step S910).

Subsequently, in the mobile network 30, the visitor location register 50 converts the common location area ID-assigned TMSI (first TMSI) into the common location area ID-assigned IMSI, and notifies the home location register 60 of the IMSI along with the IMSI2 of the IMSI of the second SIM card (step S912).

Subsequently, the authentication sequence and ciphering mode setting sequence are carried out between the mobile terminal 100 and the visitor location register 50 (steps S914 and S915).

After completing the ciphering mode setting sequence, the mobile terminal 100 stores a new TMSI2 the VLR assigns to it (step S916). Then, the mobile terminal 100 notifies the VLR that it has completed storing the new TMSI2 (step S917).

Subsequently, after registering the common location area ID-assigned IMSI of the second IMSI2 along with the associated VLR, the home location register 60 sends the registration response back to the visitor location register 50 (step S918).

Thus, the visitor location register 50 sends the second SIM card loading registration response back to the mobile terminal 100 (step S920).

Subsequently, the link release sequence is carried out between the mobile terminal 100 and the visitor location register 50 (step S922).

Thus, the mobile network 30 can recognize that the second SIM card is mounted on the mobile terminal 100.

Figure 10:
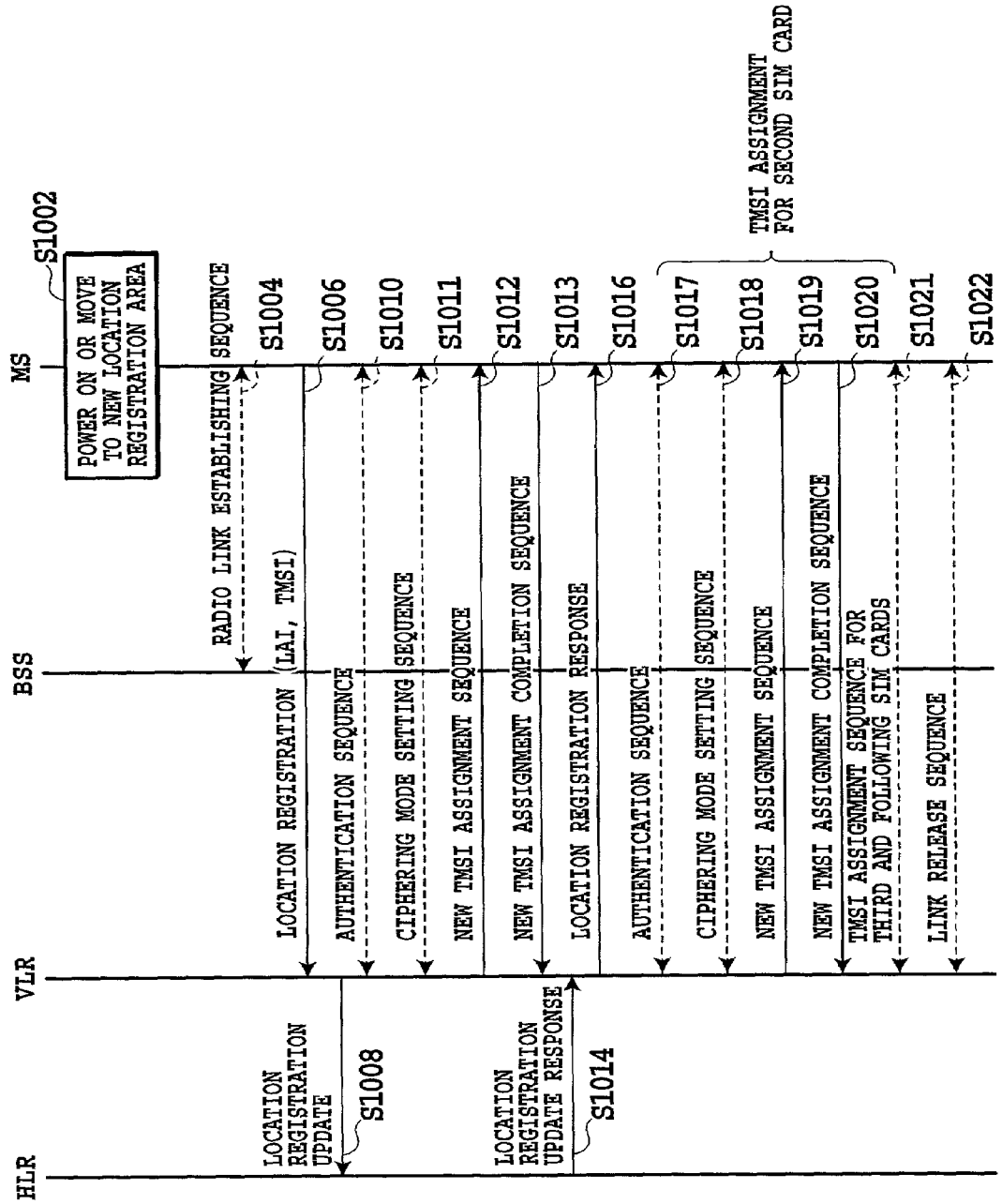
FIG. 10 is a diagram showing a communication sequence at the time when the mobile network has already recognized that a plurality of SIM cards are mounted on the mobile terminal by the communication sequence shown in FIG. 9, and moves to another location registration area in the mobile communication system to which the present embodiment in accordance with the invention is applied, in which only portions of the communication sequence relevant to the present invention is schematically shown.

FIG. 10 is a diagram showing a communication sequence at the time when the mobile network 30 has already recognized that a plurality of SIM cards 12 are mounted on the mobile terminal 100 by the communication sequence shown in FIG. 9, and moves to another location registration area in the mobile communication system to which the present embodiment in accordance with the invention is applied, in which only portions of the communication sequence relevant to the present invention is schematically shown.

First, the user turns on the mobile terminal 100, or moves to a new location registration area (step S1002).

Subsequently, a radio link establishing sequence that is defined in the mobile network is carried out between the mobile terminal 100 and the base station 20 (step S1004).

Subsequently, the mobile terminal 100 notifies the visitor location register 50 of the location registration of the LAI of the visited base station 20 using the TMSI (step S1006). In this case, if the TMSI is not yet assigned to the mobile terminal 100 as when the SIM card is being put into the mobile terminal 100, the mobile station uses the IMSI.

Subsequently, when the mobile station enters a new VLR area in the mobile network 30, the new VLR is sent to the home location register 60 to update the location registration (step S1008).

Subsequently, an authentication sequence and ciphering mode setting sequence are carried out between the mobile terminal 100 and the visitor location register 50 (steps S1010 and S1011).

After completing the ciphering mode setting sequence, the mobile terminal 100 stores a new TMSI the VLR 50 assigns to it (step S1012). Then, the mobile terminal 100 notifies the VLR 50 that it has completed storing the new TMSI (step S1013).

After registering the new VLR into its database, the home location register 60 sends a location registration update response back to the visitor location register 50 (step S1014).

Thus, the visitor location register 50 sends a location registration response back to the mobile terminal 100 (step S1016).

Because only a new TMSI assignment is needed for the second SIM card, an authentication sequence (step S1017), a ciphering mode setting sequence (step S1018), a new TMSI assignment sequence (step S1019) and a new TMSI assignment completion sequence (step S1020) occur between the VLR and the second SIM card. It is the same with the third and the following cards (step S1021). After the TMSI assignments to all the SIM cards 12 are completed, a link release sequence is carried out between the mobile terminal 100 and the visitor location register 50 (step S1022).

(1) About Billing for an Incoming Call to the Mobile Terminal 100

The mobile network temporarily stores call records (call start, end and the like) for each call of each mobile telephone number. On the other hand, as for the calling telephone number charge, the calling telephone number is billed rather than the telephone number of the called mobile terminal. As for the called telephone number charge (collect call), the network relates service providing numbers like toll-free numbers with called telephone numbers, and the called telephone numbers associated with the service providing numbers are registered in advance on the network based on the service order. Then they are charged using the call records of the called telephone numbers as always.

(2) About Billing for an Outgoing Call from the Mobile Terminal 100

When deciding the billing destination according to corporation businesses, personal use or the like, a step of selecting either the corporation telephone number or the personal telephone number is displayed on the screen of the mobile terminal. As for the outgoing call from the terminal, the charge is summed up for the telephone number selected by the user.

(3) About Outgoing or Incoming Call when the Mobile Terminal 100 is Busy

The VLR in the mobile network temporarily stores the communication state of each call of each mobile telephone number as shown in FIG. 4. When the mobile terminal 100 engaged in a telephone call has an incoming call to its telephone number or to its other telephone number set by the SIM card, and there is no vacancy in the links including the radio section, it switches the call as the user sets in advance by the contract such as sending a busy tone to the caller, sends a guidance to the caller that the call is unacceptable, connects the call to the answering telephone center, or makes a call waiting connection.

On the other hand, when the user places a call from its telephone number or from its other telephone number set by the SIM card while the mobile terminal 100 is engaged in a telephone call and there is no vacancy in the links including the radio section, it displays a message on its screen to notify the user of being unable to place the call.

Furthermore, when the mobile terminal 100 engaged in a telephone call has an incoming call to its telephone number or to its other telephone number set by the SIM card, and when there is vacancy in the links including the radio section and a plurality of call connections are allowed, the mobile terminal 100 can establish the new connection if the terminal, the mobile communication TA (Terminal Adapter) or their equivalent device have multi-connection function.

Moreover, when the mobile terminal 100 engaged in a telephone call places an outgoing call from that telephone number or from the telephone number set by the SIM card, and when there is vacancy in the links including the radio section and a plurality of call connections are allowed, the mobile terminal 100 can establish the new connection if the terminal, the mobile communication TA or their equivalent device have multi-connection function.

Furthermore, when the mobile terminal 100 engaged in a telephone call has an incoming call to its telephone number or to its other telephone number set by the SIM card, and when there is vacancy in the links including the radio section, but the terminal, the mobile communication TA or their equivalent device does not allow a plurality of call connections, a corresponding process is performed in the terminal etc.

Moreover, when the mobile terminal 100 engaged in a telephone call places an outgoing call from that telephone number or from the telephone number set by the SIM card, and when there is vacancy in the links including the radio section, but the terminal, the mobile communication TA or their equivalent device does not allow a plurality of call connections, it displays a message on its screen to notify the user of being unable to place the call.

(4) About Mail

It is possible for each mobile telephone number to have its own mail address. For example, in the i-mode service, which is a non-speech service provided by NTT DoCoMo, Inc., and has an E-mail function and an access function to the Internet, a mobile telephone number 090-CDE-FGHI can have a unique mail address such as 090-CDE-FGHI@docomo.ne.jp (its section before the @ mark (account) can be set arbitrarily). As for the location area information of the terminal, since it is the same either for speech communication or for mail communication, the location area information of the mobile terminal for the mail is the same as the location area information associated with the mobile telephone number by the VLR. Thus, although the present invention is described taking the example of the voice communication only, the mail communication is carried out in the same manner. In the mail communication, depending on vacancy status of the links of the mobile network including the radio section, a call control of a response mail etc. representing that it is connectable or it is not connectable is performed. The difference from the voice communication is that voice parts including BT voice and guidance are replaced by mails.

OTHER EMBODIMENTS

Although the foregoing embodiment describes the case where a single mobile telephone terminal is loaded with a plurality of SIM cards, the present invention is not limited to this case. In another embodiment, for example, since the mobile telephone requires the subscriber identity information or the like of at least one SIM card, the mobile telephone can integrally includes the one SIM card.

Although the foregoing embodiment describes the case where the two SIM cards are mounted on the mobile terminal 100, the present invention is not limited to the case. For example, it is obvious for those skilled in the art that the present invention is applicable to the case including three or more SIM cards.

Although the foregoing embodiment describes the case where the SIM cards are used, the present invention is not limited to this. It is obvious for those skilled in the art that the present invention is applicable to any storing media that can store information for identifying the subscribers.

Although the foregoing embodiment describes the case where the individual embodiments are implemented independently, the present invention is not limited to this case. It is obvious for those skilled in the art that the present invention is applicable to any combinations of these individual embodiments in other embodiments.

Although the foregoing embodiment describes the case where the mobile telephone network or mobile packet network employs the PDC/PDC-P system or the GSM system, the present invention is not limited to this case. For example, the present invention is applicable to the mobile telephone network or mobile packet network with different radio systems or signal sequences within the network in other embodiments.

Although the foregoing embodiments are described taking the example of the services and systems of NTT DoCoMo, Inc., the present invention is not limited to this. It is possible for the embodiments in accordance with the present invention to be applied to similar services and systems of other companies.

As described above, according to the present invention, the mobile terminal comprises detecting means (corresponding to an SIM card & key interface (I/F), a CPU, etc.) for detecting a loading of a recording medium (such as an IC card like the SIM card), and transmitting means for transmitting, when the detecting means detects at least two recording media, first subscriber identity information (e.g. IMSI, TMSI, etc.) corresponding to a first recording medium and second subscriber identity information corresponding to a newly detected recording medium, to the subscriber information management apparatus such as a visitor location register (VLR), and the subscriber information management apparatus comprises receiving means for receiving the first subscriber identity information and the second subscriber identity information from the mobile terminal, and registering means for registering location area information of the first subscriber identity information as location area information associated with the second subscriber identity information. In this way, the mobile terminal 100 can be loaded with the plurality of SIM cards, and register the state to the mobile communication network, thereby enabling an outgoing or incoming call with the telephone numbers corresponding to the respective SIM cards. As a result, it can carry out the outgoing calls, incoming calls and billing the telephone numbers corresponding to respective SIM cards.

Also, the mobile network system comprises managing means for managing communication state of a mobile terminal having at least two telephone numbers, judging means for judging, when an incoming call to the mobile terminal occurs, whether the mobile terminal is in communication by using any one of the telephone numbers, based on the communication state, and processing means for performing a process for the incoming call in accordance with the judgment. In this way, the mobile network system performs call control related to such mobile terminal.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A mobile communication system comprising a mobile terminal and a subscriber information management apparatus that manages subscriber information, wherein said mobile terminal comprises:
  detecting means for detecting a simultaneous loading of a plurality of recording media onto the mobile terminal, each of the plurality of recording media storing a subscriber identity to be sent to said subscriber information management apparatus so that a location area information of the subscriber identity information is registered; and
  transmitting means for transmitting, when said detecting means detects at least two recording media, first subscriber identity information corresponding to a first recording medium which location area information has been already registered by said subscriber information management apparatus along with second subscriber identity information corresponding to a newly detected recording medium which location area information is not yet registered by said subscriber information management apparatus so that the location area information of the second subscriber identity information is associated with the first subscriber identification information and is registered, to said subscriber information management apparatus, and wherein said subscriber information management apparatus comprises:
  receiving means for receiving said first subscriber identity information along with said second subscriber identity information from said mobile terminal; and
  registering means for associating location area information of said second subscriber identity information with said first subscriber identity information and registering the location area information of said second subscriber identity information, whereby both of said first subscriber identity information and said second subscriber identity information are activated so that simultaneous communications using said first and second subscriber identity information are allowed to said mobile terminal.

2. The mobile communication system as claimed in claim 1, wherein said recording media is a subscriber identity module card.

3. The mobile communication system as claimed in claim 1, wherein said first subscriber identity information is subscriber identity information stored in said first recording medium or temporary subscriber identity information corresponding to the subscriber identity information stored in said first recording medium, and said second subscriber identity information is subscriber identity information stored in said newly detected recording medium.

4. The mobile communication system as claimed in claim 1, wherein said first subscriber identity information and said second subscriber identity information are associated with respective telephone numbers.

5. The mobile communication system as claimed in claim 1, wherein said first subscriber identity information and said second subscriber identity information are associated with respective mail addresses.

6. A mobile terminal comprising:
   detecting means for detecting a simultaneous loading of a plurality of recording media onto the mobile terminal, each of the plurality of recording media storing a subscriber identity to be sent to a subscriber information management apparatus that manages subscriber information so that a location area information of the subscriber identity information is registered; and
   transmitting means for transmitting, when said detecting means detects at least two recording media, first subscriber identity information corresponding to a first recording medium which location area information has been already registered by said subscriber information management apparatus along with second subscriber identity information corresponding to a newly detected recording medium which location area information is not yet registered by said subscriber information management apparatus so that the location area information of the second subscriber identity information is associated with the first subscriber identification information and is registered, whereby both of said first subscriber identity information and said second subscriber identity information are activated so that simultaneous communications using said first and second subscriber identity information are allowed to said mobile terminal, to said subscriber information management apparatus.

7. A subscriber information management apparatus for managing subscriber information, comprising:
   receiving means for receiving first subscriber identity information corresponding to a first recording medium which location area information has been already registered by said subscriber information management apparatus along with second subscriber identity information corresponding to a newly detected recording medium which location area information is not yet registered by said subscriber information management apparatus from a mobile terminal, said mobile terminal being simultaneously loadable with a plurality of recording media; and
   registering means for associating location area information of said second subscriber identity information with said first subscriber identity information and registering the location area information of said second subscriber identity information, whereby both of said first subscriber identity information and said second subscriber identity information are activated so that simultaneous communications using said first and second subscriber identity information are allowed to said mobile terminal.

8. A location area information registration method for a mobile communication system comprising a mobile terminal and a subscriber information management apparatus that manages subscriber information, said method comprising:
   a detecting step of detecting a simultaneous loading of a plurality of recording media at said mobile terminal, each of the plurality of recording media storing a subscriber identity to be sent to said subscriber information management apparatus so that a location area information of the subscriber identity information is registered;
   a transmitting step of transmitting, when said detecting step detects at least two recording media, first subscriber identity information corresponding to a first recording medium which location area information has been already registered by said subscriber information management apparatus along with second subscriber identity information corresponding to a newly detected recording medium which location area information is not yet registered by said subscriber information management apparatus, from said mobile terminal to said subscriber information management apparatus so that the location area information of the second subscriber identity information is associated with the first subscriber identification information and is registered; and
   a registering step of registering location area information of said first subscriber identity information as location area information associated with said second subscriber identity information at said subscriber information management apparatus, whereby both of said first subscriber identity information and said second subscriber identity information are activated so that simultaneous communications using said first and second subscriber identity information are allowed to said mobile terminal.

* * * * *